(12) United States Patent
Lin et al.

(10) Patent No.: US 9,310,946 B2
(45) Date of Patent: Apr. 12, 2016

(54) CAPACITIVE-TYPE TOUCH CONTROL DISPLAY

(71) Applicant: Top Victory Investments Limited, Kwun Tong, Kowloon (HK)

(72) Inventors: Wei-Ting Lin, Taipei (TW); Yung-Shin Liou, New Taipei (TW)

(73) Assignee: Top Victory Investments Limited, Kowloon (HK)

( * ) Notice: Subject to any disclaimer, the term of this patent is extended or adjusted under 35 U.S.C. 154(b) by 82 days.

(21) Appl. No.: 14/162,644

(22) Filed: Jan. 23, 2014

(65) Prior Publication Data

US 2015/0205421 A1 Jul. 23, 2015

(51) Int. Cl.
G02F 1/1335 (2006.01)
G06F 3/044 (2006.01)
G02F 1/1333 (2006.01)

(52) U.S. Cl.
CPC ............ *G06F 3/044* (2013.01); *G02F 1/13338* (2013.01)

(58) Field of Classification Search
USPC .......................................................... 349/12
See application file for complete search history.

(56) References Cited

U.S. PATENT DOCUMENTS

| 2002/0063518 | A1* | 5/2002 | Okamoto et al. | 313/506 |
|---|---|---|---|---|
| 2013/0021289 | A1* | 1/2013 | Chen et al. | 345/174 |
| 2013/0235611 | A1* | 9/2013 | Franklin et al. | 362/602 |
| 2014/0001023 | A1* | 1/2014 | Guard | 200/600 |

* cited by examiner

*Primary Examiner* — Lucy Chien
(74) *Attorney, Agent, or Firm* — Muncy, Geissler, Olds & Lowe, P.C.

(57) ABSTRACT

A capacitive-type touch control display includes: a rear plate including a first polarizer sheet and a TFT array layer; a front plate including a color filter layer, a second polarizer sheet, an adhesive layer, a transparent touch sensor layer adhesively bonded to the second polarizer sheet through the adhesive layer, and a transparent hard coating layer formed on the touch sensor layer; a liquid crystal cell; and a housing including a main body and an end flange. The main body has an open end. The end flange extends inwardly and transversely from the open end, and defines a front window that exposes a touch sensing region of the touch sensor layer underneath the hard coating layer. The end flange covers a peripheral region of the touch sensor layer.

6 Claims, 2 Drawing Sheets

CAPACITIVE-TYPE TOUCH CONTROL DISPLAY

BACKGROUND OF THE INVENTION

1. Field of the Invention

This invention relates to a capacitive-type touch control display, more particularly to a capacitive-type touch control display that includes a touch sensor layer and a hard coating layer covering the touch sensor layer.

2. Description of the Related Art

FIG. 1 illustrates a conventional capacitive-type touch control display that includes a display panel 100, a capacitive-type touch panel 200, and a transparent protective cover 300. The display panel 100 has a housing 101 and a displaying unit 102 with a screen surface 103. The displaying unit 102 provides functions of displaying images on the screen surface 103. The touch panel 200 is adhesively attached to an open end 1011 of the housing 101 through an adhesive layer 104, is spaced apart from the screen surface 103 by a gap 105, and includes a plurality of conductive sensors (not shown) of indium tin oxide (ITO). The protective cover 300 is attached to the touch panel 200, and is made of glass for protecting the conductive sensors of the touch panel 200. The touch panel 200 can detect an input position on the protective cover 300 so as to provide touch control functions.

The conventional capacitive-type touch control display is disadvantageous in that the presence of the gap 105 has an adverse effect on image displaying quality. In addition, since the touch panel 200 and the protective cover 300 are disposed at an exterior of the open end 1011 of the housing 101, the overall thickness of the conventional capacitive-type touch control display is relatively large.

SUMMARY OF THE INVENTION

Therefore, an object of the present invention is to provide a capacitive-type touch control display that can overcome the aforesaid drawbacks associated with the prior art.

According to this invention, there is provided a capacitive-type touch control display that comprises: a rear plate including a first polarizer sheet and a thin film transistor array layer disposed on the first polarizer sheet; a front plate including a color filter layer, a second polarizer sheet disposed on the color filter layer, an adhesive layer, a transparent touch sensor layer adhesively bonded to the second polarizer sheet through the adhesive layer, and a transparent hard coating layer formed on the touch sensor layer, the touch sensor layer being disposed between the second polarizer sheet and the hard coating layer and being divided into a touch sensing region and a peripheral region that surrounds the touch sensing region, the hard coating layer covering the touch sensing region; a liquid crystal cell sandwiched between the front and rear plates; and a housing including a main body and an end flange. The main body defines an accommodating space, and has an open end. The accommodating space receives an assembly of the front and rear plates therein. The end flange extends inwardly and transversely from the open end, and defines a front window that exposes the touch sensing region of the touch sensor layer underneath the hard coating layer. The end flange covers the peripheral region of the touch sensor layer.

BRIEF DESCRIPTION OF THE DRAWINGS

In drawings which illustrate embodiments of the invention.

DETAILED DESCRIPTION OF THE PREFERRED EMBODIMENT

Figure 1:
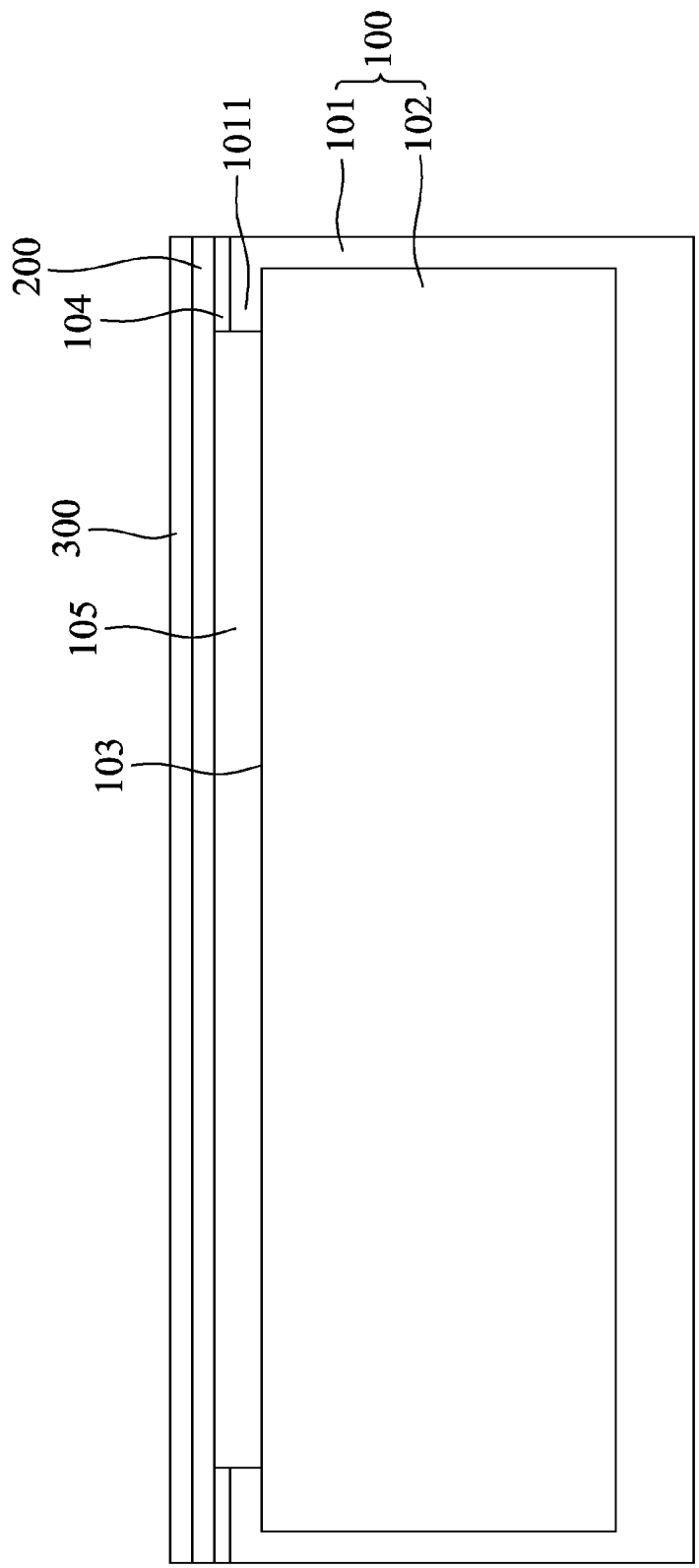
FIG. 1 is a schematic view of a conventional capacitive-type touch control display.
Figure 2:
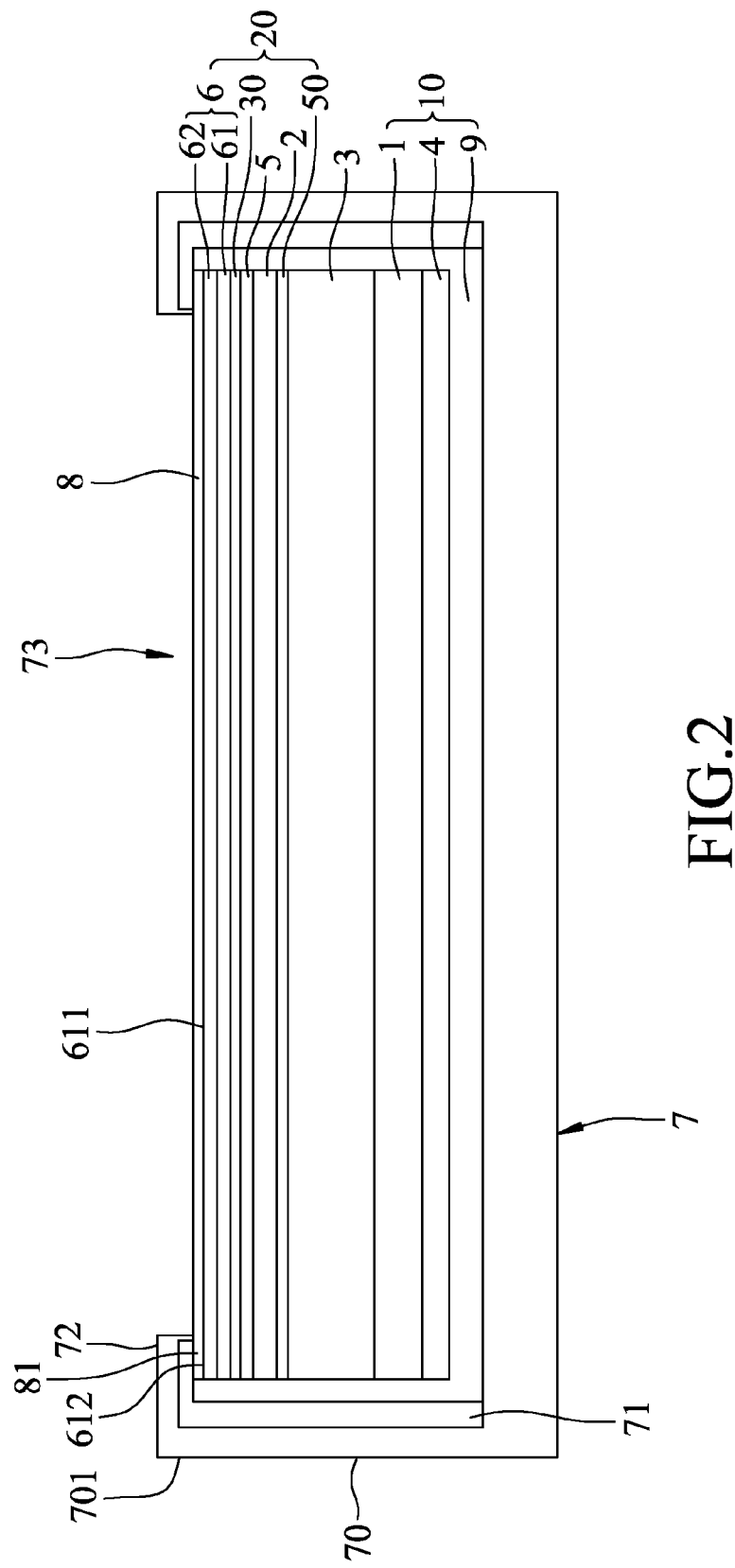
FIG. 2 is a schematic view of the preferred embodiment of a capacitive-type touch control display according to the present invention.

FIG. 2 illustrates the preferred embodiment of a capacitive-type touch control display according to the present invention. The capacitive-type touch control display includes a rear plate 10, a front plate 20, a liquid crystal cell 3, and a housing 7.

The rear plate 10 includes a first polarizer sheet 4, a thin film transistor (TFT) array layer 1 disposed on the first polarizer sheet 4, and a backlight module 9 that is attached to the first polarizer sheet 4.

The front plate 20 includes a common electrode layer 50, a color filter layer 2 disposed on the common electrode layer 50, a second polarizer sheet 5 disposed on the color filter layer 2, an adhesive layer 30, a transparent touch sensor layer 6 adhesively bonded to the second polarizer sheet 5 through the adhesive layer 30, and a transparent hard coating layer 8 formed on the touch sensor layer 6. The touch sensor layer 6 is disposed between the second polarizer sheet 5 and the hard coating layer 8, has a polymer film 61 and a patterned sensor sub-layer 62 formed on the polymer film 61, and can be divided into a touch sensing region 611 and a peripheral region 612 that surrounds the touch sensing region 611. The hard coating layer 8 covers the touch sensing region 611 and the peripheral region 612 in this embodiment. The polymer film 61 is preferably made from polyethylene terephthalate.

The liquid crystal cell 3 is sandwiched between the front and rear plates 20, 10, and includes liquid crystals that are driven by an electric field applied across the liquid crystal cell 3 between the TFT array layer 1 and the common electrode layer 50.

The housing 7 includes a main body 70 and an end flange 72. The main body 70 defines an accommodating space 71, and has an open end 701. The accommodating space 71 receives an assembly of the front and rear plates 20, 10 therein. The end flange 72 extends inwardly and transversely from the open end 701, and defines a front window 73 that exposes the touch sensing region 611 of the touch sensor layer 6 underneath the hard coating layer 8. The end flange 72 covers the peripheral region 612 of the touch sensor layer 6.

In this embodiment, the hard coating layer 8 has a peripheral end portion 81 that covers the peripheral region 612 of the touch sensor layer 6. The end flange 72 covers and contacts the peripheral end portion 81 of the hard coating layer 8. The hard coating layer 8 is preferably made from a material selected from the group consisting of a silicon compound, a nitride compound, a carbide compound, and a diamond-like carbon material.

By directly attaching the touch sensor layer 6 to the second polarizer sheet 5 and forming directly the hard coating layer 8 on the touch sensor layer 6 of the capacitive-type touch control display of this invention, the aforesaid drawbacks associated with the prior art can be eliminated.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A capacitive-type touch control display, comprising:
   a rear plate including a first polarizer sheet and a thin film transistor array layer disposed on said first polarizer sheet;
   a front plate including a color filter layer, a second polarizer sheet disposed on said color filter layer, an adhesive layer, a transparent touch sensor layer adhesively bonded to said second polarizer sheet through said adhesive layer, and a transparent hard coating layer directly formed on said touch sensor layer, said touch sensor layer being disposed between said second polarizer sheet and said hard coating layer and being divided into a touch sensing region and a peripheral region that surrounds said touch sensing region, said hard coating layer covering said touch sensing region;
   a liquid crystal cell sandwiched between said front and rear plates; and
   a housing including a main body and an end flange, said main body defining an accommodating space and having an open end, said accommodating space receiving an assembly of said front and rear plates therein, said end flange extending inwardly and transversely from said open end and defining a front window that exposes said touch sensing region of said touch sensor layer underneath said hard coating layer, said end flange covering said peripheral region of said touch sensor layer.

2. The capacitive-type touch control display of claim 1, wherein said hard coating layer has a peripheral end portion that covers said peripheral region of said touch sensor layer, said end flange covering and contacting said peripheral end portion of said hard coating layer.

3. The capacitive-type touch control display of claim 1, wherein said rear plate further includes a backlight module that is attached to said first polarizer sheet.

4. The capacitive-type touch control display of claim 1, wherein said touch sensor layer has a polymer film and a patterned sensor sub-layer formed on said polymer film.

5. The capacitive-type touch control display of claim 4, wherein said polymer film is made from polyethylene terephthalate.

6. The capacitive-type touch control display of claim 1, wherein said hard coating layer is made from a material selected from the group consisting of a silicon compound, a nitride compound, a carbide compound, and a diamond-like carbon material.

* * * * *